United States Patent
Sugiura et al.

[11] Patent Number: 5,568,386
[45] Date of Patent: Oct. 22, 1996

[54] AUTOMATED CORRECTION CONTROL SYSTEM AND METHOD FOR CHARACTERISTICS OF THROTTLE POSITION SENSOR

[75] Inventors: Masayuki Sugiura, Anjo; Masahiro Kawaguchi, Kariya; Shinichi Matsui, Nagaya; Kenji Suzuki, Okazaki, all of Japan

[73] Assignee: Aisin AW Co., Ltd., Japan

[21] Appl. No.: 336,123

[22] Filed: Nov. 4, 1994

[30] Foreign Application Priority Data

Nov. 5, 1993 [JP] Japan .................. 5-277109

[51] Int. Cl.⁶ .................................................. G06G 7/70
[52] U.S. Cl. .................. 364/424.1; 364/424.01; 477/121; 123/361
[58] Field of Search .................. 364/424.1, 426.04, 364/431.05, 431.07, 431.04; 477/120, 118, 905, 131, 65, 155, 129, 97, 143, 108, 121, 46, 43, 175, 174; 192/3.31; 180/179, 176, 170; 474/12, 17, 70; 123/361, 480

[56] References Cited

U.S. PATENT DOCUMENTS

| | | | |
|---|---|---|---|
| 4,622,867 | 11/1986 | Nishioka et al. | 477/46 |
| 4,653,621 | 3/1987 | Oshiage | 477/175 |
| 4,764,155 | 8/1988 | Kumura et al. | 474/12 |
| 4,841,445 | 6/1989 | Yamamoto et al. | 364/424.1 |
| 4,905,786 | 3/1990 | Miyake et al. | 364/424.1 |
| 4,953,091 | 8/1990 | Baltusis et al. | 364/424.1 |
| 5,016,175 | 5/1991 | Baltusis et al. | 364/424.1 |
| 5,107,724 | 4/1992 | Takizawa | 364/431.05 |
| 5,200,898 | 4/1993 | Yuhara et al. | 364/431.05 |
| 5,204,816 | 4/1993 | Wright et al. | 364/431.05 |
| 5,251,512 | 10/1993 | Koenig et al. | 364/424.1 |

*Primary Examiner*—Kevin J. Teska
*Assistant Examiner*—Jacques Louis-Jacques
*Attorney, Agent, or Firm*—Lorusso & Loud

[57] ABSTRACT

A system for automate correction of characteristics of a throttle position sensor includes the throttle position sensor, a memory, a comparator and a correction device. The throttle position sensor detects a voltage corresponding to a throttle position. The memory stores first and second voltages which correspond to respective 0% and 100% throttle position set points. The comparator performs a comparison between the voltage detected by the throttle position sensor and both the first and second voltages stored in the memory. The correction device expands by a small value the range between both the first and second voltages stored in the memory when the throttle position voltage has been determined to be greater or smaller than both the first and second voltages, corrects the first and second voltages in the memory by using the upper and lower limit values of the thus expanded range as new first and second voltages for the 0% and 100% throttle position set points, and then stores the corrected first and second voltages in the memory. A throttle position signal is hence determined based on the corrected first and second voltages, which correspond to 0% and 100% throttle position set points, stored in the memory.

12 Claims, 6 Drawing Sheets

AUTOMATED CORRECTION CONTROL SYSTEM AND METHOD FOR CHARACTERISTICS OF THROTTLE POSITION SENSOR

BACKGROUND OF THE INVENTION a. Field of the Invention

This invention relates to a system and method for automated correction of preset characteristics of a throttle position sensor in an electronic controller for an automatic transmission having shifting solenoids operated in accordance with a vehicle speed signal and a throttle position signal.

b. Description of the Related Art

In general, an electronic controller for an electronically-Controlled automatic transmission controls shifting, acceleration, fuel injection, and the like in accordance with predetermined patterns based upon vehicle speed signals and throttle position signals.

To this end, a throttle position sensor provides position signals of an engine throttle (the depression of an accelerator pedal) which are needed to control shifting, acceleration, fuel injection, and the like. As is illustrated in FIGS. 4 and 6, the throttle position sensor is in the form of a potentiometer in which arcuate strips 2 of resistor film are deposited on a ceramic substrate 1 and a metal contact (throttle-position-indicating contact) 3 slides on the resistors 2 to produce a voltage which varies in accordance with the position of the sliding contacts on the resistors. A spindle 4 on which the sliding metal contact 3 is mounted is connected via a lever to a throttle valve shaft mounted on a side of an engine throttle body, so that the spindle 4 rotates in correspondence with movement of the throttle valve. To permit accurate detection of a fully closed position of the throttle valve, an additional sliding contact (idling contact) 5 is Suitably mounted to detect an idling position of the throttle valve.

The signal which indicates the throttle position is output as an analog voltage as depicted in FIG. 5. This analog throttle position signal is converted into a digital signal, for example as shown in FIG. 6, by an A/D converter 6 as an input interface. The A/D converter 6 includes an operational amplifier 7, a D/A converter 8, a sequential comparison register 9 and a serial output buffer 10. The digital signal so obtained is then input into an electronic controller (not shown).

Generally, throttle position sensors, as normally fabricated, vary in their throttle position output voltage characteristic. In order to reduce deviations in shifting points and lockup points of automatic transmissions, the throttle position sensor is first adjusted or set to produce, for example, 10 V at the 100% throttle open position. The throttle is next moved to its 0% open position, and it is determined if the throttle position sensor output falls between tolerance limits of the output voltage that should be produced at the 0% throttle open position. If the output falls outside the tolerance limits, the throttle position sensor setting or mounting is readjusted.

However, when the conventional throttle position sensor is adjusted at either the 100% or 0% throttle open position, a variation on the opposite side (namely 0% or 100% throttle open position) cannot be avoided as shown in FIG. 7. For example if line a in FIG. 7 represents the designed output voltage characteristic of the throttle position sensor, an output voltage (V) of $V_\theta$ is supposed to be produced when the throttle opening is $\theta_2\%$. If the throttle position sensor actually has a voltage output response characteristic as represented by line b, the controller then determines that the throttle opening corresponding to the output voltage $V_\theta$ is $\theta_2\%$ instead of the actual throttle opening of $\theta_1\%$.

Since shifting of gears and engagement or release of a lockup clutch in an automatic transmission are conducted when the throttle position reaches preset shifting points and lockup points set relative to the 0% throttle open position, a shifting point or lockup point preset at the $\theta_2\%$ throttle open position is undesirably changed to the throttle open position.

Further problems also arise, inter alia, when the length of the throttle cable varies due to a change in temperature or the throttle position output voltage characteristic varies due to a change in resistance caused by the passage of time.

To cope with the above problems, the throttle position sensor is adjusted so that, as shown in FIG. 8, the output voltage from the throttle position sensor is $V_{100}$ at the 100% throttle open position. Upon starting a program, $V_0$ is stored in a memory device as an initial voltage data point for the 0% throttle open position. At the initial setting, a throttle position of $\theta\alpha\%$ is calculated by a microcomputer from a detected voltage $V\alpha$ in accordance with the following formula:

$$\theta\alpha = \frac{(V_0 - V\alpha)}{(V_0 - V_{100})} \times 100 \quad (1)$$

However, the throttle position output voltage characteristic may be different, for example, due to a mounting error of the throttle position sensor, a change in the length of the throttle cable due to a change in temperature or the like or a change in resistance due to aging. When a voltage $V_0'$ which is greater than the previously stored voltage data point $V_0$ for 0% throttle open position is detected, it is conventional practice to store $V_0'$ as a new voltage data point for the 0% throttle open position in the memory device and to then calculate a throttle position $\theta\alpha'$ in accordance with the above formula (1) wherein $V_0'$ is substituted for $V_0$.

As described above, it is conventional practice that when the throttle position output voltage characteristic has changed to update a preset reference value to the resulting changed value itself. If an incorrect value such as produced by noise is input, this incorrect value is stored, causing the computation of incorrect throttle positions.

SUMMARY OF THE INVENTION

An object of the present invention is to eliminate the above-described problems and hence to provide a system and method for automated correction of preset characteristics of a throttle position sensor, which system and method permit correction of a throttle position indication without substantially affecting shift control or the like even when a value other than a correct value is input due to a disturbance such as noise.

In one aspect of the present invention, there is thus provided a system for automated correction of preset characteristics of a throttle position sensor, the system being suited for use with an automatic transmission having shifting solenoids controlled by an electronic controller in accordance with a vehicle speed signal and a throttle position signal, comprising: a throttle position sensor for producing a throttle position voltage corresponding to a throttle position; a memory containing 0% and 100% throttle position set points stored therein; a comparator for comparing the throttle position voltage detected by said throttle position sensor with both the 0% and 100% throttle position set points stored in the memory; and correction means for expanding the range between the 0% and 100% throttle position set points stored in the memory when the comparator means indicates that the throttle position voltage is greater or smaller than both the 0% and 100% throttle position set points by adding or subtracting a small value to or from the corresponding 0% or 100% throttle position set point to produce a corresponding corrected 0% or 100% throttle position set point wherein the small value is substantially less than the difference between the throttle position voltage and the corresponding 0% or 100% throttle position set point, and then storing the corrected 0% or 100% throttle position set point in said memory; and whereby a throttle position signal is determined based on the new stored 0% and 100% throttle position set points.

In another aspect of the present invention, there is also provided a method of automated correction of preset characteristics of a throttle position sensor, the method being suited for application to an automatic transmission having shifting solenoids controlled by an electronic controller in accordance with a vehicle speed signal and a throttle position signal, comprising the following steps: storing 0% and 100% throttle position set points for a throttle position voltage from the throttle position sensor in a memory corresponding to 0% and 100% throttle open positions; inputting a throttle position voltage which is output from the throttle position sensor; expanding the range between the stored 0% or 100% throttle position set points by a small value when the throttle position voltage is greater or smaller than both the 0% and 100% throttle position set points, and updating both the stored 0% and 100% throttle position set points in the memory to correspond to the expanded range; determining a corrected throttle position signal on the basis of the updated 0% and 100% throttle position set points; and repeating the above steps successively as needed.

To avoid storage of a wrong value, which has occurred due to a sudden noise, as a corrected throttle position set point as described above, the present invention does not store the changed value upon determination of the changed value but only changes the stored value by a small value which is substantially less than the difference between the throttle position voltage and the corresponding throttle position set point. Based on the updated values, a throttle position signal is determined.

Even if a value other than a correct value is input due to a disturbance such as a noise, the present invention makes it possible to correct a throttle position set point without substantially affecting shift control or the like since the throttle position set point is only changed by the small value.

The throttle position sensor can be set to produce a maximum voltage output at the 0% throttle open position and a minimum voltage output at the 100% throttle open position as shown in FIG. 8 or, conversely, a minimum voltage output at the 0% throttle open position and a maximum voltage output at the 100% throttle open position. In the latter case, the throttle position output voltage characteristic line has an opposite inclination.

DETAILED DESCRIPTION OF THE INVENTION AND PREFERRED EMBODIMENT

Figure 3:
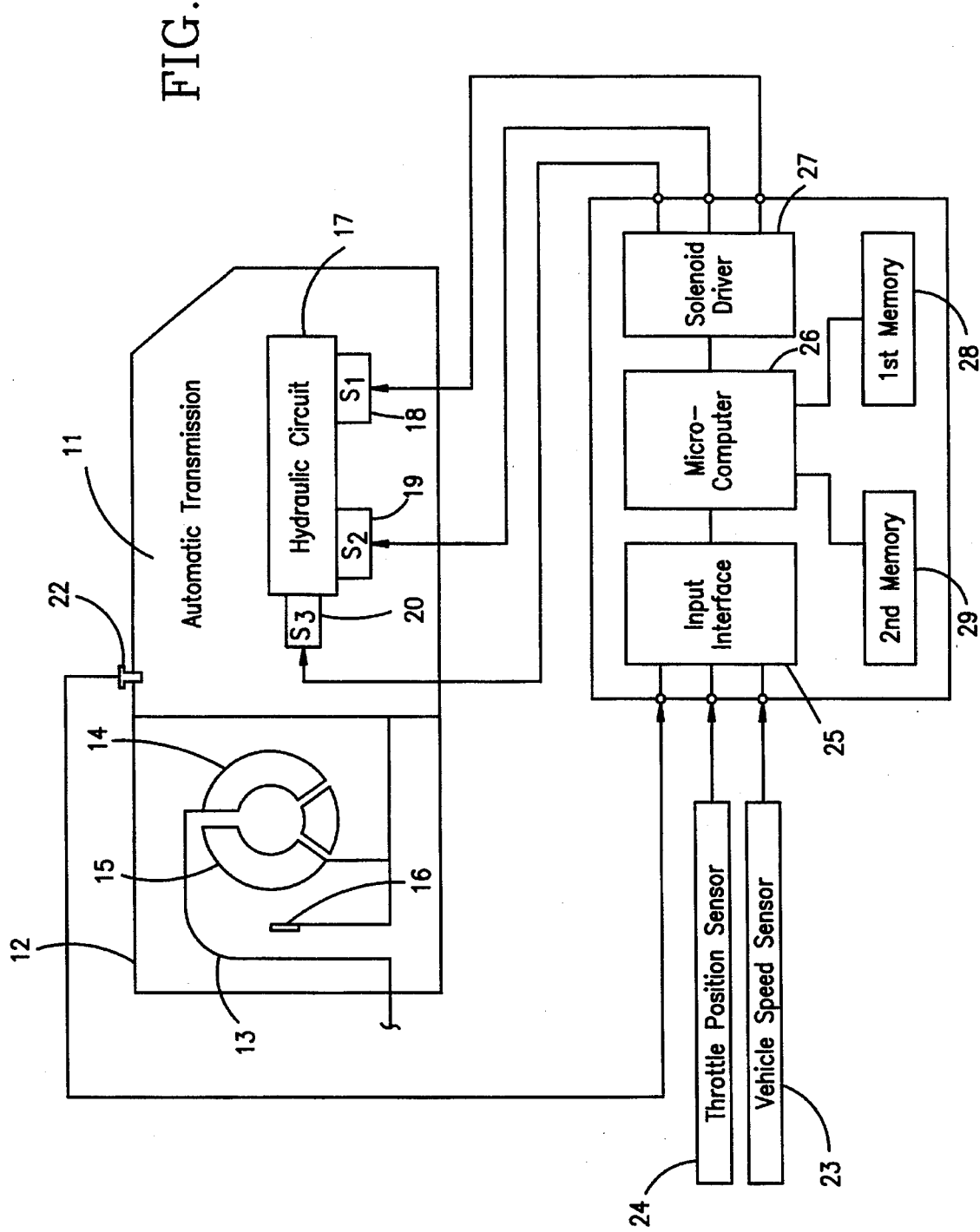
FIG. 3 is a block diagram of an electronic controller for an automatic transmission to which the present invention can be applied.
Figure 4:
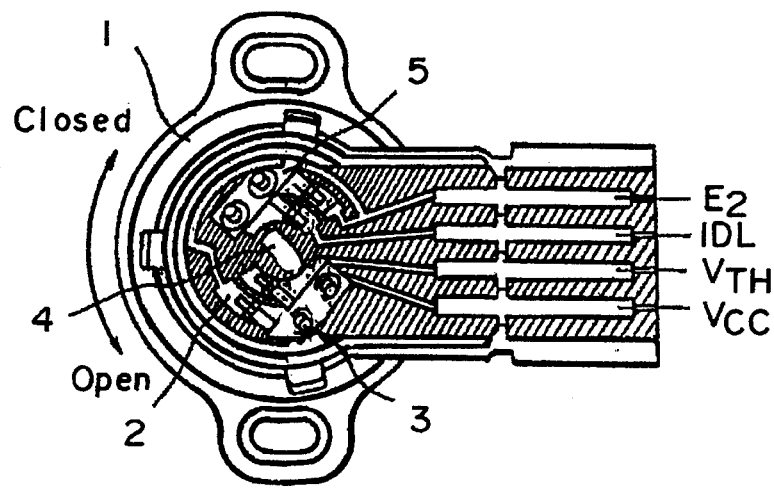
FIG. 4 is a plan view of a conventional throttle position sensor.
Figure 5:
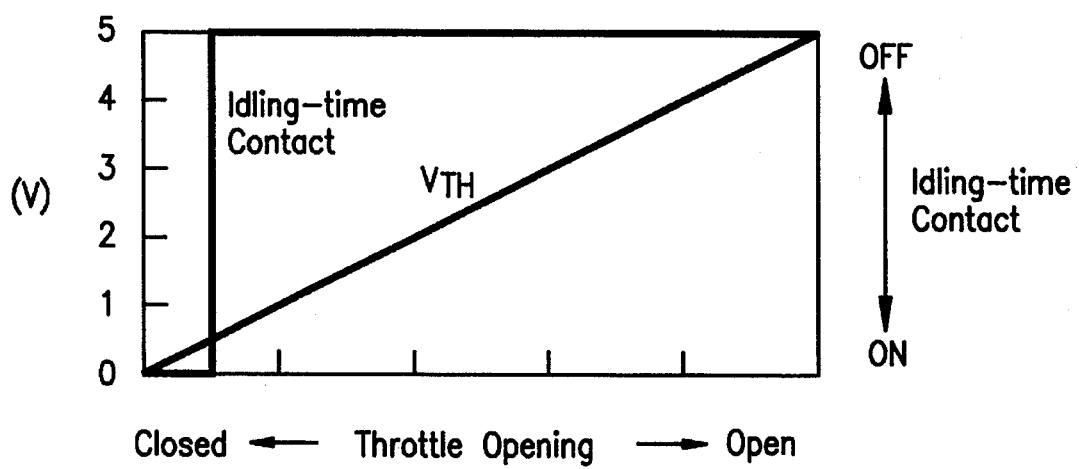
FIG. 5 is a graph showing the output characteristic of the conventional throttle position sensor of FIG. 4.
Figure 6:
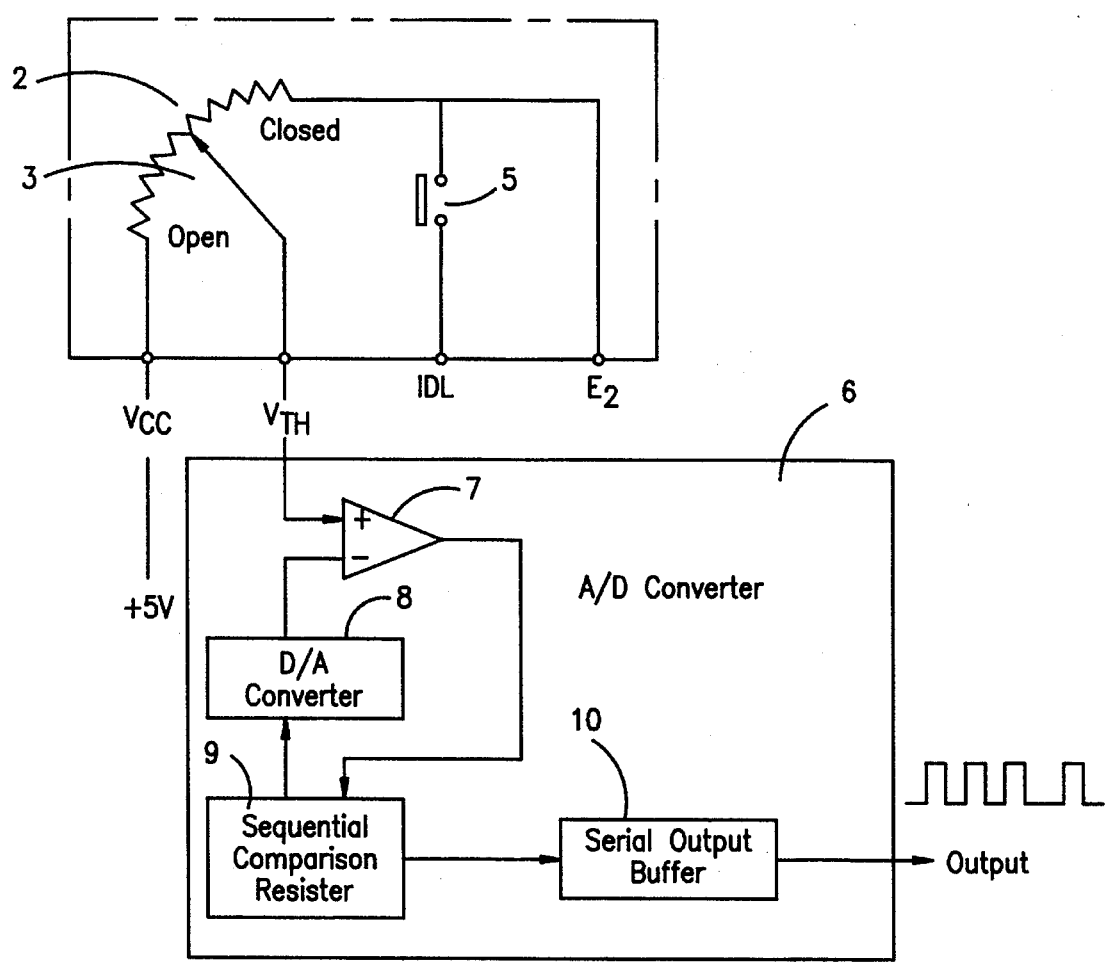
FIG. 6 is a simplified block diagram of an A/D converter for the conventional throttle position sensor.
Figure 7:
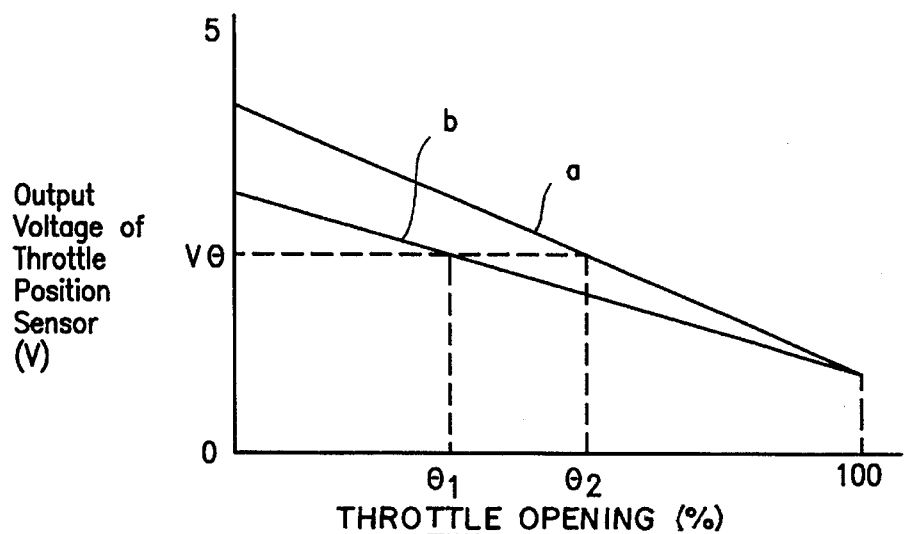
FIG. 7 is a graph illustrating the opening output voltage characteristics of the conventional throttle sensor and showing one example of conventional correction methods of a throttle position signal.
Figure 8:
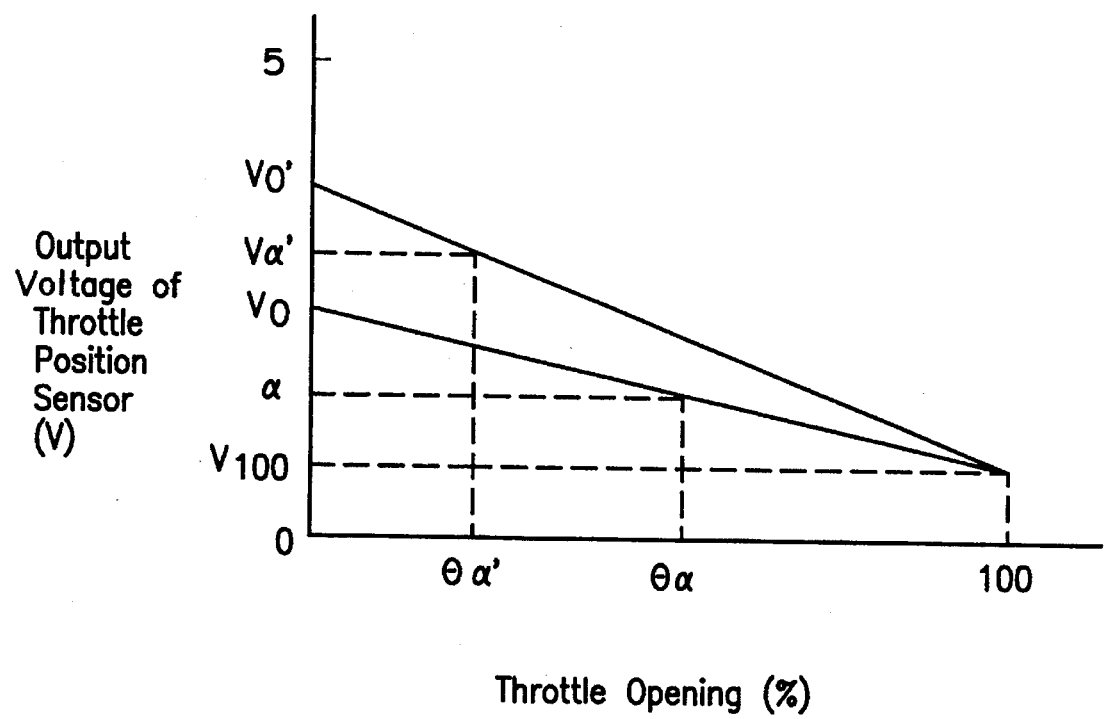
FIG. 8 is a graph illustrating another example of the conventional correction methods of a throttle position signal.

Referring first to FIG. 3, an automatic transmission 11 in accordance with one embodiment of the invention includes, in a forward part thereof, a torque converter 12. Accommodated within a housing 13 of the torque converter 12 are a pump impeller 14, a turbine liner 15 and a lockup clutch 16. In a torque conversion range of a shift pattern, the lockup clutch 16 is brought into engagement with the housing 13 so that power from an engine is transmitted directly to the automatic transmission via the housing 13.

The automatic transmission 11 is constructed of a known planetary gear unit and friction engagement devices for selectively fixing or releasing desired elements in the planetary gear unit. By automatically and selectively actuating the friction engagement devices in the hydraulic circuit 17 according to the state of running, running at a optimal gear ratio is obtained. The hydraulic circuit 17 is operated by shifting solenoids 18, 19 and a lockup solenoid 20. By a combination of on/off signals applied to the shifting solenoids 18, 19, the friction engagement devices are selectively actuated to perform shifting. Further, the lockup solenoid 20 is turned on or off to engage or release the lockup clutch 16.

Based on a shift pattern set for each shift position, the individual solenoids 18, 19, 20 are actuated by an electronic controller 21 in accordance with a vehicle speed and a throttle position signal. Namely, signals from a shift position sensor 22, a vehicle speed sensor 23 and a throttle position sensor 24 are fed to a microcomputer 26 via an input interface 25.

A shift pattern and a lockup diagram corresponding to a shift position (for example, D-range or L-range) stored in a first memory 28 are selected. Based on the shift pattern, a gear ratio optimal to the vehicle speed and throttle position is determined and at the same time, either engagement or release of the lockup clutch is determined based on the lockup diagram. The resulting signals are then output to a solenoid driver 27 so that the individual solenoids 18, 19, 20 are actuated selectively.

Figure 1:
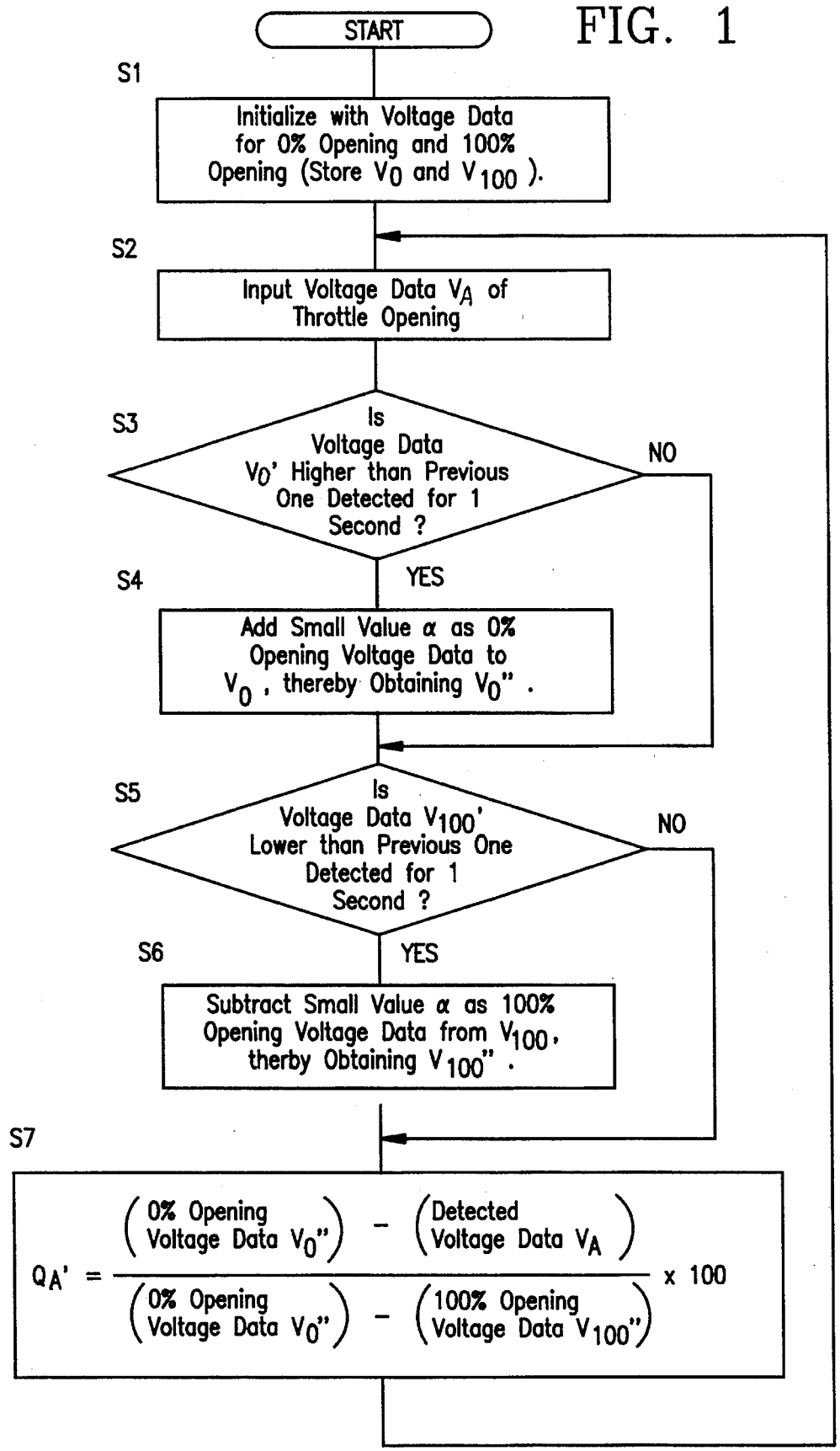
FIG. 1 is a step diagram of a controller program for automated correction of characteristics of a throttle position sensor according to one embodiment of the present invention.
Figure 2:
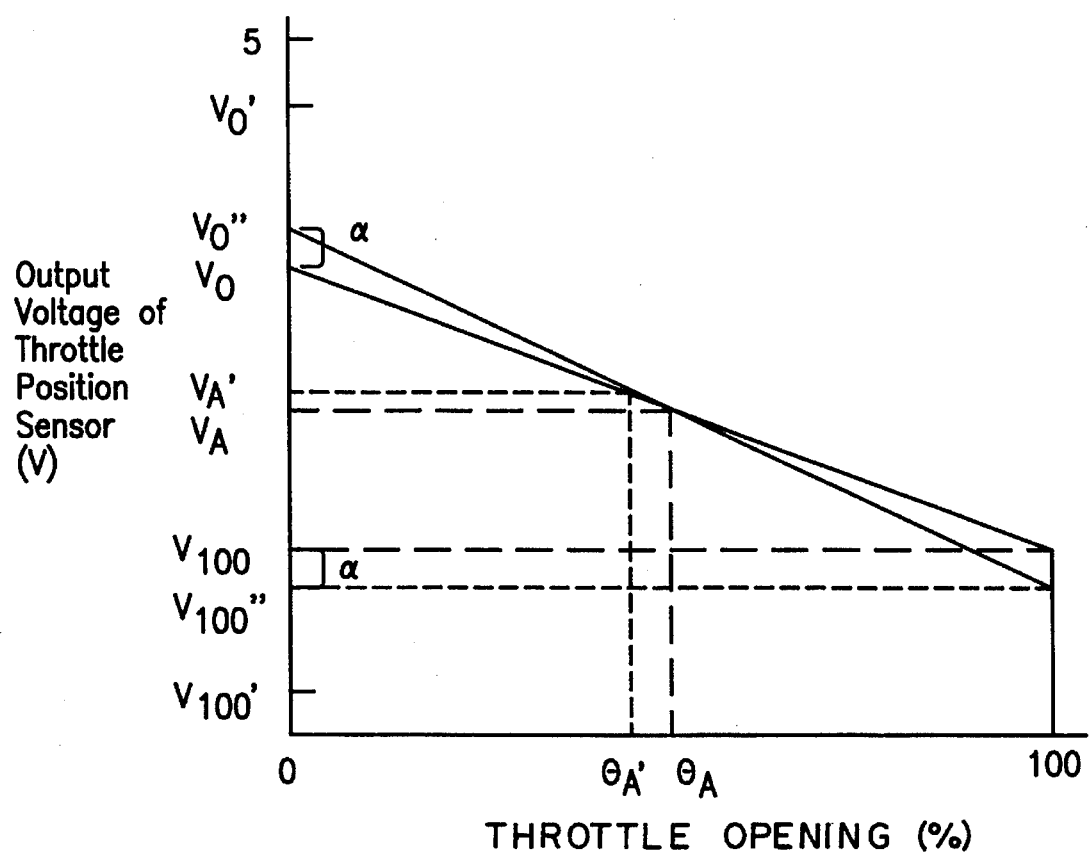
FIG. 2 is a graph illustrating the automated correction of the characteristics of the throttle position sensor according to the embodiment of the present invention.

The signal output from the throttle position sensor 24 is delivered via the interface 25 to the microcomputer 26 and is then stored in a second memory 29. With reference to FIGS. 1 and 2, an automated correction procedure for the characteristics of the throttle position sensor is described.

First, the mounting of the throttle position sensor 24 is adjusted so that an output voltage from the throttle position sensor becomes $V_{100}$ (for example, 0.8 V) at 100% throttle open position. Upon starting the program, a voltage $V_0$ (for example, 4.2 V) is stored as an initial set point for 0% throttle open position in the second memory 29 (step S1).

This voltage $V_0$ is set at a minimum value which is considered to occur in view of the characteristics of the throttle position sensor 24. Usually, a throttle position $\theta_A$ corresponding to a throttle position voltage $V_A$ is calculated by the microcomputer 26 in accordance with formula (2) described below. Hence, an output voltage from the throttle position sensor 24, that is, the throttle position voltage $V_A$ is input (step S2).

$$\theta_A = \frac{(V_0 - V_A)}{(V_0 - V_{100})} \times 100 \qquad (2)$$

Correction of the set points is performed when the throttle position output voltage characteristic differs from the design characteristic, for example, due to a mounting error of the throttle position sensor 24, a change in the length of the throttle cable caused by a change in temperature or the like, a change in resistance due to aging or a wrong value due to a sudden noise. When a voltage $V_0'$ (for example, 4.8 V) greater than the previously stored voltage $V_0$ for 0% throttle open position is detected, the microcomputer 26 then determines whether the voltage $V_0'$ continues for 1 second (step S3).

When the voltage $V_0'$ is determined to have continued for 1 second, the voltage $V_0'$ is not stored as is, but a corrected voltage $V_0''$ (for example, 4.21 V) is calculated by adding a small value $\alpha$ (for example, 0.01 V when the voltage $V_0$ is 4.2 V) to the previously stored voltage $V_0$ for 0% opening and is stored (step S4).

In the event of detection of a voltage $V_{100}'$ (for example, 0.3 V) smaller than a previously stored voltage $V_{100}$ (for example, 0.8 V) for 100% opening, it is determined by the microcomputer 26 whether or not the voltage $V_{100}'$ continues for 1 second (step S5).

When the voltage $V_{100}'$ is found to have continued for 1 second as a result, the voltage $V_{100}'$ is not stored as is, but a corrected voltage $V_{100}''$ (for example, 0.79 V) is calculated by subtracting a small value (for example, 0.01 V if the voltage $V_{100}$ is 0.8 V) from the previously stored voltage $V_{100}$ for 100% opening and is stored (step S6).

A throttle position signal $\theta_A'$ corresponding to a detected voltage $V_A'$ is then calculated by the microcomputer 26 in accordance with the following formula (3) (step S7):

$$\theta_A'' = \frac{(V_0'' - V_A)}{(V_0'' - V_{100}'')} \times 100 \qquad (3)$$

The above embodiment has been described based on the design that the output voltage becomes maximum at 0% throttle open position but minimum at 100% throttle open position. However, the present system and method can be applied equally to an opposite design, that is, a design where the output voltage becomes minimum when the throttle position is 0% and maximum when the throttle position is 100%. In the latter case, the throttle position output voltage characteristic line has an opposite inclination.

Having now fully described the invention, it will be apparent to one of ordinary skill in the art that many changes and modifications can be made thereto without departing from the spirit or scope of the invention as set forth in the following claims.

What is claimed is:

1. A system for automated correction of preset characteristics of a throttle position sensor, said system being suited for use with an automatic transmission having shifting solenoids controlled by an electronic controller in accordance with a vehicle speed signal and a throttle position signal, comprising:

a throttle position sensor for producing a throttle position voltage corresponding to a throttle position;

memory means containing 0% and 100% throttle position set points stored therein;

comparator means for comparing the throttle position voltage detected by said throttle position sensor with both the 0% and 100% throttle position set points stored in said memory means;

correction means for adding a small value to a greater one of the 0% and 100% throttle position set points stored in said memory means when said comparator means indicates that the throttle position voltage is greater than the greater one or for subtracting a small value from a smaller one of the 0% and 100% throttle position set points stored in said memory means when said comparator means indicates that the throttle position voltage is smaller than the smaller one to produce a corresponding corrected 0% or 100% throttle position set point wherein the small value is substantially less than the difference between the throttle position voltage and the corresponding 0% or 100% throttle position set point, and then storing the corrected 0% or 100% throttle position set point in said memory means; and means for determining the throttle position signal from the throttle position voltage based on the stored 0% and 100% throttle position set points as substituted by any stored corrected 0% and 100% throttle position set points.

2. A system according to claim 1, wherein the stored 0% throttle position set point is greater than the stored 100% throttle position set point;

said comparator means comprises first comparator means for determining whether or not the throttle position voltage produced by said throttle position sensor is greater than the stored 0% throttle position set point, and second comparator means for determining whether or not the throttle position voltage produced by said throttle position sensor is smaller than the stored 100% throttle position set point; and said correction means comprises first correction means for adding a first small value to the stored 0% throttle position set point when said first comparator means indicates that the throttle position voltage is greater than the stored 0% throttle position set point and then storing the sum of the first small value and the stored 0% throttle position set point as a corrected 0% throttle position set point in said memory means, and second correction means for subtracting a second small value from the stored 100% throttle position set point when said second comparator means indicates that the throttle position voltage is smaller than the stored 100% throttle position set point and then storing the difference of the second small value and the stored 100% throttle position set point as a corrected 100% throttle position set point in said memory means;

said first and second small values being substantially smaller than the respective differences of the throttle position voltage from the corresponding 0% and 100% throttle position set points.

3. A system according to claim 2, wherein said first correction means and said second correction means require that the throttle position voltage detected by said throttle position sensor continues to be greater or smaller, respectively, than the respective 0% throttle position set point and 100% throttle position set point for at least 1 second prior to adding or subtracting, respectively, the respective first and second small values to and from the respective 0% and 100% throttle position set points and storing any corrected throttle position set points.

4. A system according to claim 2, wherein the 0% throttle position set point stored in said memory means is initially set at a minimum value which said throttle position sensor can output at a 0% throttle open position.

5. A system according to claim 1, wherein said correction means requires that the throttle position voltage detected by said throttle position sensor continues to be greater than the greater one of the 0% and 100% throttle position set points or smaller than the smaller one of the 0% and 100% throttle position set points for at least 1 second prior to adding or subtracting, respectively, a small value to the corresponding one of the 0% and 100% throttle position set points and storing any corrected throttle position set point.

6. A system according to claim 1, wherein of the 0% and 100% throttle position set points stored in said memory means, the throttle position set point corresponding to the throttle position indicated by the greater throttle position voltage is initially set at a minimum voltage value which said throttle position sensor can output at the throttle position indicated by the greater throttle position voltage.

7. A method of automated correction of preset characteristics of a throttle position sensor, said method being suited for application to an automatic transmission having shifting solenoids controlled by an electronic controller in accordance with a vehicle speed signal and a throttle position signal, comprising the following steps:

storing 0% and 100% throttle position set points for a throttle position voltage from said throttle position sensor in a memory corresponding to 0% and 100% throttle open positions;

inputting a throttle position voltage which is output from said throttle position sensor;

comparing the throttle position voltage with a greater one of the stored 0% and 100% throttle position set points;

adding a small value to the greater one when the throttle position voltage is greater than the greater one;

storing the sum of the small value and the stored greater one as a corrected greater one of the 0% and 100% throttle position set points in said memory;

comparing the throttle position voltage with a smaller one of the stored 0% and 100% throttle position set points;

subtracting a small value from the smaller one when the throttle position voltage is smaller than the smaller one;

storing the difference of the small value subtracted from the smaller one as a corrected smaller one of the 0% and 100% throttle position set points in said memory;

said small value being substantially less than the difference between the throttle position voltage and the respective 0% or 100% throttle position set points;

determining a corrected throttle position signal on the basis of the stored 0% and 100% throttle position set points as substituted by any stored corrected 0% and 100% throttle position set points; and repeating the above steps successively as needed.

8. A method according to claim 7, wherein the respective 0% and 100% throttle position set points stored in said memory comprise a first voltage ($V_0$) corresponding to the 0% throttle open position and a second voltage ($V_{100}$) corresponding to the 100% throttle open position and lower than the first voltage; the first voltage ($V_0$) is updated to a current first voltage ($V_0''$) by adding the small value to the first voltage ($V_0$) when a throttle position voltage produced by said throttle position sensor is greater than the first voltage ($V_0$); and based on the current voltage, a corrected throttle position signal ($\theta_A'$) is determined in accordance with the following formula:

$$\theta_A' = \frac{(V_0'' - V_A)}{(V_0'' - V_{100})} \times 100$$

and the first voltage updating step and the corrected throttle position signal determining step are successively repeated as needed.

9. A method according to claim 8, wherein to detect a throttle position voltage greater than the first voltage stored in said memory means, the throttle position voltage is required to continue greater than the first voltage for at least 1 second.

10. A method according to claim 7, wherein the respective 0% and 100% throttle position set points stored in said memory means comprise a first voltage ($V_0$) corresponding to the 0% throttle open position and a second voltage ($V_{100}$) corresponding to the 100% throttle open position and lower than the first voltage; the second voltage ($V_{100}$) is updated to a second current voltage ($V_{100}''$) corresponding to the 100% throttle open position by subtracting the small value from the second voltage ($V_{100}$) when a throttle position voltage detected by said throttle position sensor is smaller than the second voltage ($V_{100}$); and based on the second current voltage, a corrected throttle position signal ($\theta_A'$) is determined in accordance with the following formula:

$$\theta_A' = \frac{(V_0'' - V_A)}{(V_0 - V_{100}'')} \times 100$$

and the second voltage updating step and the throttle position signal determining steps are successively repeated as needed.

11. A method according to claim 10, wherein to detect a throttle position voltage smaller than the second voltage stored in said memory means, the throttle position voltage is required to continue less than the second voltage for at least 1 second.

12. A method according to claim 7, wherein the adding and subtracting steps require the throttle position voltage to continue to be respectively greater or smaller than the throttle position set points for at least 1 second.

* * * * *